United States Patent
Seki

(10) Patent No.: US 9,889,431 B2
(45) Date of Patent: Feb. 13, 2018

(54) METHOD FOR PRODUCING CHLORINE AND CATALYST

(75) Inventor: Kohei Seki, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 483 days.

(21) Appl. No.: 13/059,829

(22) PCT Filed: Aug. 20, 2009

(86) PCT No.: PCT/JP2009/064895
§ 371 (c)(1),
(2), (4) Date: Feb. 18, 2011

(87) PCT Pub. No.: WO2010/021407
PCT Pub. Date: Feb. 25, 2010

(65) Prior Publication Data
US 2011/0150749 A1 Jun. 23, 2011

(30) Foreign Application Priority Data
Aug. 22, 2008 (JP) .................................. 2008-214710

(51) Int. Cl.
*C01B 7/04* (2006.01)
*B01J 23/46* (2006.01)
(Continued)

(52) U.S. Cl.
CPC ............ *B01J 23/462* (2013.01); *B01J 21/063* (2013.01); *B01J 35/002* (2013.01); *B01J 35/108* (2013.01);
(Continued)

(58) Field of Classification Search
CPC .... B01J 23/462; B01J 35/002; B01J 35/1009; B01J 35/1014; B01J 35/1019; B01J 35/108; C01B 7/04
(Continued)

(56) References Cited

U.S. PATENT DOCUMENTS 5,908,607 A * 6/1999 Abekawa et al. ............ 423/502
5,935,897 A   8/1999 Trübenbach et al.
(Continued)

FOREIGN PATENT DOCUMENTS

CN   1154340 A    7/1997
EP   1870159 A1   12/2007
(Continued)

OTHER PUBLICATIONS

French et al. "Fluidizable Catalysts for Hydrogen Production Hydrogen from Steam Reforming Biomass Pyrolysis Product", Fuel Chemistry Division Preprints 2002, 47(2), pp. 759-760.*
(Continued)

*Primary Examiner* — Ngoc-Yen Nguyen
(74) *Attorney, Agent, or Firm* — Sughrue Mion, PLLC

(57) ABSTRACT

A method for producing chlorine by oxidizing hydrogen chloride with oxygen in the presence of a catalyst, wherein the catalyst satisfies the following conditions (i) and (ii): (i) the BET specific surface area is from 1 to 250 m$^2$/g; and (ii) the value of H/D, wherein H is the half width of the peak of a pore distribution curve as determined by a mercury intrusion method; and D is the average pore diameter, is from 0.6 to 1.5.

5 Claims, 1 Drawing Sheet

(51) Int. Cl.
  *B01J 21/06* (2006.01)
  *B01J 35/00* (2006.01)
  *B01J 35/10* (2006.01)
  *B01J 37/00* (2006.01)

(52) U.S. Cl.
  CPC ....... *B01J 35/1009* (2013.01); *B01J 35/1014* (2013.01); *B01J 35/1019* (2013.01); *B01J 37/0009* (2013.01); *C01B 7/04* (2013.01)

(58) Field of Classification Search
  USPC ............. 423/500, 502, 507; 502/527.14, 349
  See application file for complete search history.

(56) References Cited

U.S. PATENT DOCUMENTS

| 2005/0031529 | A1 | 2/2005 | Hibi et al. | |
| 2011/0086270 | A1* | 4/2011 | Amos et al. | 429/219 |

FOREIGN PATENT DOCUMENTS

| EP | 1958693 | A1 | 8/2008 |
| JP | 09-117674 | A | 5/1997 |
| JP | 2000-281314 | A | 10/2000 |
| JP | 2002-292279 | A | 10/2002 |
| JP | 2006-219325 | A | 8/2006 |
| JP | 2007-297230 | A | 11/2007 |

OTHER PUBLICATIONS

Office Action dated Sep. 4, 2012 in Japanese Patent Application No. 2008-214710 with partial translation.
First Office Action dated Sep. 5, 2012 in Chinese Patent Application No. 200980132599.1 to Sumitomo Chemical Co., Ltd., with translation.
Chinese Office Action dated Jul. 30, 2013 by the Chinese Patent Office in counterpart CN Application No. 200980132599.1.
European Search Report issued in counterpart EP Application No. 09808340.5, dated May 26, 2014.
Third Office Action issued Feb. 12, 2014 in counterpart Chinese Patent Application No. 200980132599.1 with translation.
G. Leofanti et al., "Surface area and pore texture of catalysts", Catalysis Today 41 (1998), p. 207-219.
Tozuka, "Science and Technology in Catalysis 1994," 41-50 (1995), Kodansha Ltd.

* cited by examiner

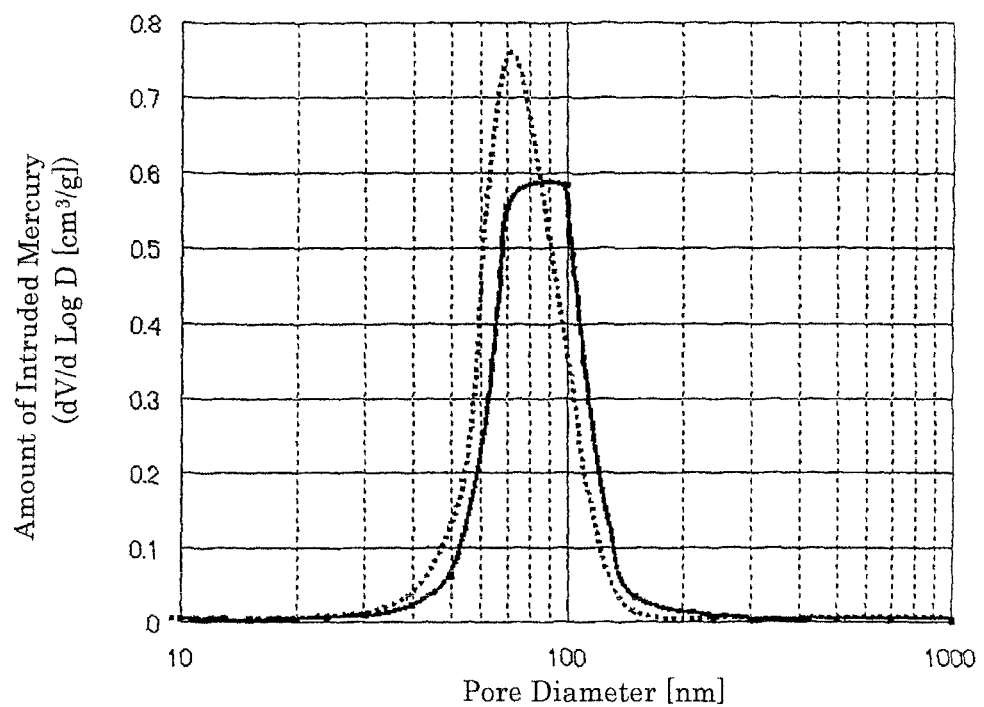

METHOD FOR PRODUCING CHLORINE AND CATALYST

CROSS REFERENCE TO RELATED APPLICATIONS

This application is a National Stage of International Application No. PCT/JP2009/064895 filed Aug. 20, 2009, which claims priority from Japanese Patent Application No. 2008-214710 filed Aug. 22, 2008, the contents of all of which are incorporated herein by reference in their entirety.

TECHNICAL FIELD

The present invention relates to a method for producing chlorine by oxidizing hydrogen chloride with oxygen in the presence of a catalyst, and a catalyst suitable for this production method.

BACKGROUND ART

Chlorine is useful as a raw material of vinyl chloride or phosgene; and it is known that chlorine can be obtained by oxidizing hydrogen chloride with oxygen in the presence of a catalyst.

As a catalyst used in an oxidation reaction of hydrogen chloride with oxygen, for example, a catalyst is proposed, which is designed so that its BET specific surface area is from 1 to 250 m²/g, its width of the half height (half width of the peak of a pore distribution curve) of a pore size distribution (pore distribution) as determined by a mercury intrusion porosimetry (mercury intrusion method) is less than 0.6-fold of the average pore diameter (average pore diameter), and its average pore diameter and the ratio of the pore volume to the average pore diameter are within specific ranges (Patent Document 1).
Patent Document 1; JP-A-09-117674

DISCLOSURE OF THE INVENTION

The catalyst described in Patent Document 1, however, is designed so as to exhibit a comparatively sharp pore distribution curve as recognized by the definition of the upper limit of the half width of the peak of the pore distribution curve, and according to the invention of Patent Document 1, it is considered that such a catalyst is advantageous. The catalyst has high mechanical strength, and is suitable for use in an oxidation reaction of hydrogen chloride by a fluidized-bed reaction method. However, when the catalyst is used in an oxidation reaction of hydrogen chloride by a fixed-bed reaction method, sintering of the catalyst easily occurs due to heat history with the passage of the reaction time and it becomes difficult to keep sufficient catalyst activity, and as a result, there may be a problem that the conversion of hydrogen chloride decreases with time.

An object of the present invention is to provide a method for producing chlorine by oxidizing hydrogen chloride with oxygen, which can prevent sintering and thereby exhibit sufficient catalyst activity for a long time and keep the hydrogen chloride conversion high; and a catalyst used for the method.

In order to solve the problem described above, the present inventor has made painstaking studies. As a result, the inventor has found that a catalyst designed so as to have a somewhat broader pore distribution curve than those of the catalysts conventionally used is more effective, and has completed the present invention. That is, the present invention includes the following aspects.

(1) A method for producing chlorine by oxidizing hydrogen chloride with oxygen in the presence of a catalyst, wherein the catalyst satisfies the following conditions (i) and (ii):

(i) the BET specific surface area is from 1 to 250 m²/g; and (ii) the value of H/D, wherein H is the half width of the peak of a pore distribution curve as determined by a mercury intrusion method; and D is the average pore diameter, is from 0.6 to 1.5.

(2) The method for producing chlorine according to the item (1), wherein the catalyst is a supported ruthenium oxide catalyst.

(3) The method for producing chlorine according to the item (1) or (2), wherein the catalyst is molded into a spherical granular shape or a cylindrical shape.

(4) The method for producing chlorine according to any one of the items (1) to (3), which is performed by a fixed-bed reaction method.

(5) A catalyst used in a reaction for oxidizing hydrogen chloride with oxygen, which contains ruthenium oxide, and satisfies the following conditions (i) and (ii):

(i) the BET specific surface area is from 1 to 250 m²/g; and (ii) the value of H/D, wherein H is the half width of the peak of a pore distribution curve as determined by a mercury intrusion method; and D is the average pore diameter, is from 0.6 to 1.5.

(6) The catalyst according to the item (5), which is molded into a spherical granular shape or a cylindrical shape.

BRIEF DESCRIPTION OF THE DRAWING

FIG. 1 A graph showing pore distribution curves of catalysts used in Example 1 and Comparative Example 1.

MODES FOR CARRYING OUT THE INVENTION

The method for producing chlorine of the present invention is a method in which hydrogen chloride is oxidized with oxygen in the presence of a specific catalyst satisfying the following conditions (i) and (ii) (hereinafter referred to as a "specific catalyst") to produce chlorine. By using the specific catalyst, sufficient catalyst activity can be exhibited over a long time in the oxidation of hydrogen chloride with oxygen, and the conversion of hydrogen chloride can be kept high.

(i) the BET specific surface area is from 1 to 250 m²/g; and (ii) the value of H/D, wherein H is the half width of the peak of a pore distribution curve as determined by a mercury intrusion method; and D is the average pore diameter, is from 0.6 to 1.5.

The specific catalyst has a BET specific surface area of 1 to 250 m²/g as described in condition (i) above. The BET specific surface area is preferably 5 to 100 m²/g, more preferably 10 to 25 m²/g. When the BET specific surface area is smaller than the range described above, the catalyst hardly exhibits sufficient catalyst activity. On the other hand, when it is larger than the range described above, the heat stability of the catalyst deteriorates, and the degree of sintering of the catalyst due to the heat history becomes higher with the passage of time, and thus the catalyst activity tends to deteriorate with time.

The BET specific surface area in the present invention can be measured by, for example, the method described later in Examples.

The specific catalyst has a value of H/D, wherein H is the half width of the peak of a pore distribution curve as determined by a mercury intrusion method; and D is the average pore diameter, of 0.6 to 1.5, as described in condition (ii) above. The value of H/D is preferably 0.6 to 1.2, more preferably 0.7 to 1.0.

When the value of H/D is less than 0.6, there are too many contact points between the materials composing the catalyst and thus, the mechanical strength increases but the heat stability of the catalyst deteriorates. Consequently, the degree of sintering of the catalyst due to heat history becomes higher with the passage of time, resulting in the tendency that the catalyst activity deteriorates with time. On the other hand, when the value of H/D is more than 1.5, the number of contact points between the materials decreases, thus resulting in a tendency that the catalyst strength deteriorates.

The pore distribution curve as determined by a mercury intrusion method in the present invention is a curve obtained by plotting the amount of intruded mercury at each pressure P, obtained in a pore distribution measurement by a mercury intrusion method, with showing the pore diameter d (nm) at each pressure P calculated based on Washburn's equation as shown below on the abscissa axis and showing the amount of intruded mercury (dV/d log D [cm$^3$/g]) at each pressure P on the ordinate axis.

Washburn's equation: pore diameter $d$ (nm)$=(-4\gamma \cos \theta/P)\times 10^3$ wherein
P: pressure (MPa)
γ: surface tension of mercury (482×10$^{-3}$ N/m)
θ: angle of contact of mercury (140 deg)

The half width H of the peak obtained from the pore distribution curve in the present invention refers to the difference in the pore diameter d between the two points at which the amount of intruded mercury corresponds to half the amount of intruded mercury at the peak top of the curve. On the other hand, the average pore diameter D in the present invention refers to a value calculated based on the following equation. In the following equation, the cumulative pore volume and the cumulative pore surface area can be calculated from the amount of intruded mercury at each pressure P, obtained in the pore distribution measurement by the mercury intrusion method, and the pore diameter d at each pressure P, obtained from the Washburn's equation above.

Average Pore Diameter D (nm)=4V/S wherein
V: cumulative pore volume (nm$^3$/g)
S: cumulative pore surface area (nm$^2$/g)

The pore volume of the specific catalyst obtained by the mercury intrusion method is preferably 0.05 to 1.0 cm$^3$/g, more preferably 0.1 to 0.4 cm$^3$/g. When the pore volume is smaller than the range described above, the catalyst activity may be insufficient, whereas when it is larger than the range described above, thermal conductivity of the catalyst tends to be low and the heat stability of the catalyst may deteriorate.

The specific catalyst may be made of an active catalyst component alone, or may be made of an active catalyst component and a carrier supporting the active catalyst component. The active catalyst component in the specific catalyst is not particularly limited, and catalysts for producing chlorine containing a publicly known active catalyst component which are used in the production of chlorine by oxidation of hydrogen chloride with oxygen (for example, copper catalysts, chrome catalysts, and ruthenium catalysts) can be used. Specifically, as the copper catalyst, catalysts obtained by adding various compounds as a third component to copper chloride and potassium chloride, which are generally called Deacon catalysts, are preferably exemplified; as the chrome catalyst, catalysts containing chrome oxide, as shown in JP-A-61-136902, JP-A-61-275104, JP-A-62-113701, JP-A-62-270405, and the like, are preferably exemplified; and as the ruthenium catalyst, catalysts containing ruthenium oxide, as shown in JP-A-9-67103, JP-A-10-338502, JP-A-2000-281314, JP-A-2002-79093, JP-A-2002-292279, and the like, are preferably exemplified.

Among the catalysts described above, the ruthenium catalysts, in particular the catalysts containing ruthenium oxide, are preferably used as the specific catalyst. The catalyst containing ruthenium oxide may be, for example, made of substantially ruthenium oxide alone, may be supported ruthenium oxide in which ruthenium oxide is supported on a carrier, or may be a complex oxide made of ruthenium oxide and other oxides such as alumina, titania, silica, zirconia and niobium oxide. The catalyst made of supported ruthenium oxide (the supported ruthenium oxide catalyst) is more preferable because high activity can be obtained from even a small amount of ruthenium oxide. The oxidation number of ruthenium in ruthenium oxide is usually +4 and ruthenium dioxide ($RuO_2$) is generally used as ruthenium oxide, but the ruthenium oxide catalyst may contain ruthenium having a different oxidation number or ruthenium oxide being in the form other than ruthenium dioxide.

The supported ruthenium oxide catalyst can be obtained by, for example, making a carrier support a ruthenium compound and then calcining the carrier in an oxygen-containing gas atmosphere. Examples of the carrier include oxides and complex oxides of an element selected from aluminum, silicon, titanium, zirconium and niobium, and activated carbon. They may be used alone or as a mixture of two or more kinds thereof. Of these, alumina, silica, titanium oxide and zirconium oxide are preferable, and titanium oxide having a rutile type crystal structure is particularly preferable.

In the supported ruthenium oxide catalyst, the weight ratio of ruthenium oxide/the carrier is usually from 0.1/99.9 to 20/80, preferably from 0.5/99.5 to 15/85, and it is adequate to adjust the ratio of the ruthenium compound and the carrier so that the weight ratio is within this range. When the ratio of ruthenium oxide is lower than the ratio described above, the catalyst activity may be insufficient. On the other hand, when the ratio is higher than the range described above, the catalyst cost may increase.

The shape of the specific catalyst is not particularly limited, and the catalyst may be used in the shape of a spherical granule, cylinder, triangle pole, square pole, polygonal column, ring or honeycomb. Alternatively, the catalyst may be molded and then pulverized and classified, and the resulting granular catalyst having an appropriate size may be used. A molded article in the shape of a spherical granule or a cylinder is preferable. Usually, molded articles in the shape of a cylinder, triangle pole, square pole, polygonal column, ring or the like are often obtained by extrusion molding or tablet compression. In the case of extrusion molding, the extruded article may be fractured and/or cut into an appropriate length before use. Further, for such purposes as decreasing the amount of powder generated when the catalyst is used, sharp edges in the fractured surfaces and cut surfaces of the fractured and/or cut molded article may be chamfered off using a rotating machine or the like.

The size of the specific catalyst is not particularly limited, but when the size is too big, sufficient activity cannot be obtained, and thus the reaction may not sufficiently proceed. The diameter of the specific catalyst, therefore, is, usually preferably 5 mm or less. On the other hand, when the size of the specific catalyst is excessively small, the pressure loss in a packed-bed becomes large. Therefore, the diameter is usually preferably 1 mm or more. The diameter of the catalyst (molded article) herein refers to the diameter of a sphere in a spherical granule, the diameter of a cross section in a cylinder, and the maximum diameter of a cross section in other shapes.

Among the specific catalysts described above, the catalyst of the present invention particularly is a catalyst containing ruthenium oxide satisfying conditions (i) and (ii) described above, and being preferably molded into spherical granules or cylinders. Such a catalyst of the present invention is particularly suitable as a catalyst used in an oxidation reaction of hydrogen chloride with oxygen, and is especially suitable for an oxidation reaction by a fixed-bed reaction method described later.

A method for satisfying conditions (i) and (ii) described above, especially a method for satisfying condition (ii) when obtaining the specific catalyst (the catalyst of the present invention) will be explained below. The specific catalyst, however, is not limited thereto, and it goes without saying that any catalyst produced by any method may be used so long as the conditions (i) and (ii) are satisfied.

Usually, when the catalyst is made of an active catalyst component alone, it is formed by molding a catalyst raw material containing the active catalyst component; and when the catalyst is an active catalyst component supported on a carrier, it is formed by mixing a catalyst raw material containing an active catalyst component with a carrier raw material and then molding the resultant, or by molding a carrier raw material and then impregnating the resulting molded article with an active catalyst component. As a method for molding the catalyst raw material or the carrier raw material, extrusion molding or tablet compression is generally adopted.

One example of the method for satisfying conditions (i) and (ii), especially condition (ii), is a method of adding an appropriate pore-forming agent to the catalyst raw material or the carrier raw material when molding the raw material. Specifically, for example, it is possible to mix the pore-forming agent into the powdery catalyst raw material or carrier raw material, and then knead the mixture with water or the like, mold the mixture, and then perform calcination of the molded article, washing of it with water, or the like. In order to satisfy particularly condition (ii), it is preferable to use a pore-forming agent whose particle size distribution is not uniform. Examples of the pore-forming agent include methyl cellulose-based organic binders and water-soluble polymers, fibrous cellulose, inorganic salts such as ammonium chloride, sodium chloride and potassium chloride, and carbon materials such as carbon black, activated carbon and carbon nanotubes. These pore-forming agents may be used alone; however, in order to satisfy especially condition (ii), the agents are preferably used as a mixture of two or more kinds thereof, and it is more preferable to select two or more kinds of agents having different particle sizes. The amount of the pore-forming agent used (the total amount when two or more kinds of agents are used) may be suitably determined so as to form desired pores, and the amount is usually from 0.1 to 30 parts by weight, preferably from 0.5 to 20 parts by weight based on 100 parts by weight of the catalyst raw material or the carrier raw material. When the amount of the pore-forming agent is too small, the value of H/D becomes less than 0.6, whereas when the amount is too large, the value tends to be more than 1.5.

Another method for satisfying condition (ii) is a method using powders having moderately nonuniform particle size distributions as the catalyst raw material or the carrier raw material to be molded. Specifically, the method may be a method of preparing powdery catalyst raw materials or powdery carrier raw materials having different average particle sizes, mixing them in an appropriate mixing ratio, and then molding the mixture (hereinafter referred to as a "mixing method"); or a method of adding a precipitant dropwise to a solution containing the catalyst raw material or the carrier raw material to produce a precipitate by the action of hydrolysis or the like, subjecting the precipitate to filtration, drying or the like as necessary, calcining the resulting precipitate, and then molding the calcined precipitate (hereinafter referred to as a "precipitation method").

In the mixing method, when a powdery catalyst raw material or a powdery carrier raw material having different average particle sizes are prepared, for example, multiple commercially available powders having different average particle sizes may be mixed, or a powder having a predetermined average particle size may be moderately fractured by using a fracture machine or the like with controlling the processing time or the like.

Conditions concerning the particle size of the powder obtained by the precipitation method include the dropping time of a precipitant as well as pH control or addition of a anti-aggregation agent such as ammonium sulfate in hydrolysis, the aging time, stirring conditions during generation of precipitated particles, and the temperature, time and atmosphere in calcination of the resulting precipitate. Controlling these conditions appropriately is also effective.

In the precipitation method, it is more preferable to mix multiple precipitates which are produced under different conditions to obtain a powder having a nonuniform particle size distribution. The kind and dropping time of the precipitant used may be appropriately determined according to the kind or the concentration of the catalyst raw material or the carrier raw material in the solution.

A still another method for satisfying condition (ii) is a method of making the time of kneading, which is performed in molding of the catalyst raw material or carrier raw material, shorter than usual.

The method for producing chlorine of the present invention is not particularly limited except that the reaction is performed in the presence of the specific catalyst described above, and procedures and conditions used in the conventionally known oxidation reaction of hydrogen chloride with oxygen may be appropriately adopted. It is preferable to perform the method by the fixed-bed reaction method which particularly requires heat stability of the catalyst.

When the method for producing chlorine of the present invention is performed by the fixed-bed reaction method, for example, a hydrogen chloride-containing gas and an oxygen-containing gas are passed through a catalyst packed-bed in which the specific catalyst is packed, thereby oxidizing hydrogen chloride.

The catalyst packed-bed is formed by, for example, packing the content obtained by mixing the specific catalyst and, if necessary, a packing material formed by molding a substance inactive to an oxidation reaction of hydrogen chloride (such as alumina balls) and/or a carrier alone, in a reaction tube equipped with a temperature-controlling means.

When the oxidation reaction is performed by the fixed-bed reaction method, the raw material gases (the hydrogen chloride-containing gas and the oxygen-containing gas) may be passed through one catalyst packed-bed, and the raw material gases may also be sequentially passed through at least two catalyst packed-beds in which different contents are packed or which are adjusted to different temperatures. In any case, although two or more kinds of the specific catalysts can be packed in one catalyst packed-bed, it is preferable that the content packed in one catalyst packed-bed is only one kind of the specific catalyst described above. When two or more catalyst packed-beds are used, it is preferable that the content packed in each catalyst packed-bed has a composition same as or similar to the composition of the other content(s). For example, when packing materials formed by molding the inactive substance and/or the carrier alone are used in combination, the ratio thereof to the specific catalyst is preferably set constant in the catalyst packed-beds. When two or more kinds of the specific catalysts described above are used in combination, the mixing ratio is preferably set constant in the catalyst packed-beds.

Conventionally known reactors may be used without particular limitation as a reactor used in the oxidation reaction by the fixed-bed reaction method. Examples of the reactor include a single-tube gas phase reactor in which one reaction tube is provided in the direction of gas flow, or a multitubular reactor in which two or more reaction tubes are provided in the direction of gas flow. When two or more catalyst packed-beds are used, they may have two or more temperature-controlling means by which temperatures of multiple zones in the tube axial direction of one reaction tube are controlled to different temperatures, or two or more reaction tubes may independently have a temperature-controlling means. The inactive substance may be packed in an upper part and/or a lower part of the catalyst packed-bed. For example, when two catalyst packed-beds are sequentially formed in one reaction tube in its axial direction, the inactive substance may be put between the beds as a partition. It is not necessary, however, to definitely partition adjacent two catalyst packed-beds; the catalyst packed-beds may be in direct contact with each other.

The hydrogen chloride-containing gas is not particularly limited, and examples thereof include a gas generated by a reaction of hydrogen and chlorine, a gas generated by heating hydrochloric acid, and any hydrogen chloride-containing gases such as a by-product gas generated in a thermal decomposition reaction or a burning reaction of a chlorine compound; a carbonylation reaction of an organic compound with phosgene; a chlorination reaction of an organic compound with chlorine; production of chlorofluoroalkanes, or the like; and an exhaust combustion gas generated in an incinerator. These hydrogen chloride-containing gases may contain unreacted raw materials or reaction products formed in reactions or the like for respectively generating the gas as impurities. In such a case, it is preferable that the concentration of the impurities is within the range such that the concentration of hydrogen chloride in the gas is within the range described later. It is also possible to add steam, an inert gas or the like to the hydrogen chloride-containing gas so long as the concentration of hydrogen chloride in the gas is within the range described later. In particular, it is preferable to make the gas contain steam because it can smooth the temperature distribution in the catalyst packed-bed.

With respect to the various reactions described above carried out for obtaining the hydrogen chloride-containing gas, specifically, for example, as the thermal decomposition reaction of a chlorine compound, a reaction in which vinyl chloride is generated from 1,2-dichloroethane, and a reaction in which tetrafluoroethylene is generated from chlorodifluoromethane are exemplified; as the carbonylation reaction of an organic compound with phosgene, a reaction in which an isocyanate is generated from an amine, and a reaction in which a carbonic ester is generated from a hydroxyl compound are exemplified; and as the chlorination reaction of an organic compound with chlorine, a reaction in which allyl chloride is generated from propylene, a reaction in which ethyl chloride is generated from ethane, and a reaction in which chlorobenzene is generated from benzene are exemplified. Examples of the production of a chlorofluoroalkane include production of dichlorodifluoromethane and trichloromonofluoromethane by a reaction of carbon tetrachloride and hydrogen fluoride, and production of dichlorodifluoromethane and trichloromonofluoromethane by a reaction of methane, chlorine and hydrogen fluoride.

The concentration of hydrogen chloride in the hydrogen chloride-containing gas is usually 10% by volume or more, preferably 50% by volume or more, more preferably 80% by volume or more. When the concentration of hydrogen chloride is too low, the production efficiency deteriorates and separation of the produced chlorine and a recycle operation when recycling unreacted oxygen may be sometimes complicated.

As the oxygen-containing gas, air may be used, or pure oxygen may also be used. Pure oxygen can be obtained by using a usual industrial method such as a pressure swing method or cryogenic separation of air.

When the oxidation reaction of hydrogen chloride is performed by the fixed-bed reaction method, usually, the supply rate of the hydrogen chloride-containing gas is preferably from about 10 to 20000 $h^{-1}$ in terms of the supply rate of the gas per L of the catalyst (L/h; at 0° C. and 1 atm.), that is, expressed as GHSV. On the other hand, the supply rate of the oxygen-containing gas is preferably from about 10 to 20000 $h^{-1}$ in terms of the supply rate of the gas per L of the catalyst (L/h; at 0° C. and 1 atm.), that is, expressed as GHSV.

In the production method of the present invention, it is necessary that the ratio of hydrogen chloride (the hydrogen chloride-containing gas) and oxygen (the oxygen-containing gas) is theoretically ¼ mol of oxygen per mol of hydrogen chloride in order to completely oxidize hydrogen chloride to chlorine, but usually, oxygen is used in 0.1 to 10-fold of the theoretical amount.

In the production method of the present invention, reaction conditions are not particularly limited, but because the oxidation reaction of hydrogen chloride is an equilibrium reaction, if the reaction is performed at too high a temperature, the equilibrium conversion decreases. It is, therefore, preferable to perform the reaction at a comparatively low temperature, and the reaction temperature is usually from 100 to 500° C., preferably from 200 to 450° C. The reaction pressure is usually from about 0.1 to 5 MPa.

EXAMPLES

The present invention will be described by way of examples below, but the present invention is not limited thereto. In the example and comparative example below, "part" means "parts by weight" and "%" means "% by weight" unless otherwise indicated.

Physical properties of each catalyst used in the example and comparative example were determined by the following methods.

<Pore Volume, Average Pore Diameter D, and Half Width H of Peak Obtained from Pore Distribution Curve>

First, 0.6 to 1.2 g of a catalyst used in the measurement was weighed and dried in a dryer at 110° C. for 4 hours, and then the weight was precisely weighed to give a sample. This sample was set in a cell of a pore volume measurement apparatus ("AutoPore III 9420" manufactured by MICROMERITICS), the pressure in the cell system was adjusted to 50 μmHg or less, and the system was filled with mercury. Pressures from 0.007 MPa to 207 MPa were applied stepwise to the cell, and the amount of intruded mercury was measured at each pressure with setting the equilibrium waiting time of intruded mercury at 10 seconds.

The pore volume ($cm^3/g$) was obtained by dividing the total amount ($cm^3$) of intruded mercury when the pressures from 0.007 MPa to 207 MPa were applied by the sample weight (g).

The average pore diameter D (nm) was obtained as follows. First, the pore diameter d at each pressure P was calculated from the amount of intruded mercury at each pressure P based on the Washburn's equation described above. Then, the surface area Sr of the pore at each pressure P was calculated from the pore diameter d at each pressure P and the amount of intruded mercury at each pressure P. The accumulated pore surface area S ($nm^2/g$) was obtained by dividing the accumulated value ($nm^2$) of the pore surface area Sr at each pressure P when the pressures from 0.007 MPa to 207 MPa were applied by the sample weight (g). The accumulated pore volume V ($nm^3/g$) was obtained by dividing the accumulated value of the pore volume at each pressure P when the pressures from 0.007 MPa to 207 MPa were applied (in other words, the total amount of intruded mercury ($nm^3$) when the pressures from 0.007 MPa to 207 MPa were applied) by the sample weight (g). Using S and V, the average pore diameter D (nm) was obtained according to the following equation:

$$\text{Average Pore Diameter } D \text{ (nm)} = 4V/S$$

The half width H (nm) was obtained by obtaining a pore distribution curve by plotting the measurement results, with showing the pore diameter d (nm) at each pressure P calculated based on Washburn's equation as described above on the abscissa axis and showing the amount of intruded mercury (dV/d log D [$cm^3/g$]) at each pressure P on the ordinate axis, and reading values (two points) of the pore diameter d in the curve where the amounts of intruded mercury corresponds to half the amount of intruded mercury at the peak top, and calculating the difference between them.

<BET Specific Surface Area>

First, 1 to 2 g of a catalyst used in the measurement was weighed and dried at 110° C. for 1.5 hours under a nitrogen atmosphere, and then the weight was precisely weighed to give a sample. The specific surface area ($m^2/g$) of this sample was obtained using a specific surface area measurement apparatus ("SA-1100" manufactured by Sibata Scientific Technology Ltd.), in accordance with a BET one point method.

<Catalyst Strength>

A cylindrical catalyst sample having a length of 4.5 mm or more in the axial direction was laid on the center of a sample table of a digital Kiya hardness meter ("KHT20N" manufactured by Fujiwara Scientific Company) so that the axial direction of the catalyst was parallel to the surface of the sample table, and the hardness (N) of the catalyst was measured. The measurement was carried out with respect to 20 or more samples, and the sum of the obtained measurements was divided by the number of samples measured to obtain the average value (N/sample).

Example 1

Preparation of Catalyst

Titanium oxide ("STR-60R"; 100% rutile type, manufactured by Sakai Chemical Industry Co., Ltd.) and α-alumina ("AES-12" manufactured by Sumitomo Chemical Co., Ltd.) were mixed in a weight ratio of titanium oxide:α-alumina=34:66, to which 4 parts by weight of an organic binder ("YB-152A" manufactured by Yuken Industry Co., Ltd.), 12.5 parts by weight of a titania sol ("CSB" manufactured by Sakai Chemical Industry Co., Ltd.; $TiO_2$ content; 40% by weight) and 24.8 parts by weight of pure water were added, and the mixture was kneaded. The kneaded product was extruded into cylinders each having a diameter of 3.0 mmφ; dried; and fractured into a length of about 4 to 6 mm. The resulting molded article was calcined in the air at 800° C. for 3 hours, thereby obtaining a carrier made of a mixture of titanium oxide and α-alumina. Next, the carrier was impregnated with an aqueous solution containing ruthenium chloride in an amount sufficient to give a predetermined support ratio, and dried and calcined in the air at 250° C. for 2 hours, thereby obtaining a bluish gray supported ruthenium oxide catalyst (1) in which ruthenium oxide is supported on the carrier at a support ratio of 2% by weight.

Physical properties of the obtained supported ruthenium oxide catalyst (1) are shown in Table 1. The pore distribution curve of the supported ruthenium oxide catalyst (1) is shown as a solid line in FIG. 1.

(Oxidation Reaction of Hydrogen Chloride (Evaluation of Initial Catalyst Activity))

Next, using the supported ruthenium oxide catalyst (1) obtained above, an oxidation reaction of hydrogen chloride was performed with oxygen by a fixed-bed reaction method. That is, 1.0 g of the supported ruthenium oxide catalyst (1) was diluted with 12 g of α-alumina balls with a diameter of 2 mm ("SSA 995" manufactured by Nikkato Corporation), the catalyst was packed in a nickel reaction tube (inner diameter; 14 mm), and 12 g of the same α-alumina balls as above were packed in a gas inlet side of the reaction tube as a pre-heating bed. A hydrogen chloride gas (hydrogen chloride concentration; 99.999% by volume) and an oxygen gas (pure oxygen) were supplied to this reaction tube under an ordinary pressure at the rates of 0.214 mol/h (4.8 L/h at 0° C. and 1 atm.) for the hydrogen chloride gas and 0.107 mol/h (2.4 L/h at 0° C. and 1 atm.) for the oxygen gas, and the reaction tube (catalyst bed) was heated to 282 to 283° C., thereby performing the reaction.

At the time point of 1.5 hours from the start of the reaction, sampling was performed by passing the gas at the outlet of the reaction tube through a 30% aqueous potassium iodide solution for 20 minutes, the amount of chlorine generated was measured by iodometric titration, and the generation rate (mol/h) of chlorine was obtained. The conversion (%) of hydrogen chloride was calculated from the generation rate of chlorine and the supply rate (mol/h) of hydrogen chloride according to the following equation.

Conversion (%) of Hydrogen Chloride=[generation rate (mol/h) of chlorine×2/supply rate (mol/h) of hydrogen chloride]×100

The conversion (%) of hydrogen chloride, as obtained above, is shown in Table 1 as initial catalyst activity of the supported ruthenium oxide catalyst (1).

(Accelerated Thermal Deterioration Test of Catalyst)

Next, the supported ruthenium oxide catalyst (1) obtained above was subjected to the accelerated thermal deterioration test described below.

That is, 1.2 g of the supported ruthenium oxide catalyst was packed in a quartz reaction tube (inner diameter: 21 mm), and a hydrogen chloride gas (hydrogen chloride concentration: 99.999% by volume) was supplied at a rate of 0.086 mol/h (a rate of 1.9 L/h at 0° C. and 1 atm.), an oxygen gas (pure oxygen) was supplied at a rate of 0.075 mol/h (a rate of 1.7 L/h at 0° C. and 1 atm.), a chlorine gas was supplied at a rate of 0.064 mol/h (a rate of 1.4 L/h at 0° C. and 1 atm.), and steam was supplied at a rate of 0.064 mol/h (a rate of 1.4 L/h at 0° C. and 1 atm.) to the reaction tube under an ordinary pressure. The reaction tube (catalyst bed) was heated to 375 to 380° C. At the time point of 50 hours from the start of heating, the supply of the gases and steam and heating were stopped, and the tube was cooled while supplying a nitrogen gas at a rate of 0.214 mol/h (a rate of 4.8 L/h at 0° C. and 1 atm.).

(Oxidation Reaction of Hydrogen Chloride (Evaluation of Catalyst Activity after Accelerated Thermal Deterioration Test))

Next, 1.0 g of the catalyst was taken from 1.2 g of the supported ruthenium oxide catalyst (1') which had been subjected to the accelerated thermal deterioration test. The oxidation reaction of hydrogen chloride was performed with oxygen by the fixed-bed reaction method and the conversion (%) of hydrogen chloride was obtained in the same manner as in the oxidation reaction of hydrogen chloride in the (Evaluation of Initial Catalyst Activity), except that the catalyst taken here was used. The conversion of hydrogen chloride is shown in Table 1, as the catalyst activity of the supported ruthenium oxide catalyst (1') after the accelerated thermal deterioration test.

Comparative Example 1

A bluish gray supported ruthenium oxide catalyst (C1) in which ruthenium oxide was supported on the carrier at a support ratio of 2% by weight was obtained in the same manner as in Example 1, except that 2 parts by weight of methyl cellulose ("Metolose 65SH-4000" manufactured by Shin-Etsu Chemical Co., Ltd.) was used instead of 4 parts by weight of the organic binder ("YB-152A" manufactured by Yuken Industry Co., Ltd.) used in the (Preparation of Catalyst) of Example 1.

Physical properties of the obtained supported ruthenium oxide catalyst (C1) are shown in Table 1. A pore distribution curve of the supported ruthenium oxide catalyst (C1) is shown in FIG. 1 as a dashed line.

Next, an oxidation reaction of hydrogen chloride was performed with oxygen by a fixed-bed reaction method in the same manner as in the oxidation reaction of hydrogen chloride in the (Evaluation of Initial Catalyst Activity) of Example 1 except that the supported ruthenium oxide catalyst (C1) obtained here was used as the catalyst, thereby obtaining the conversion (%) of hydrogen chloride. The conversion (%) of hydrogen chloride is shown in Table 1 as initial catalyst activity of the supported ruthenium oxide catalyst (C1).

Next, the supported ruthenium oxide catalyst (C1) obtained above was subjected to the same accelerated thermal deterioration test as in Example 1. Then, 1.0 g of the catalyst was taken from 1.2 g of the supported ruthenium oxide catalyst (C1') which had been subjected to the accelerated thermal deterioration test. The oxidation reaction of hydrogen chloride was performed with oxygen by the fixed-bed reaction method and the conversion (%) of hydrogen chloride was obtained in the same manner as in the oxidation reaction of hydrogen chloride in the (Evaluation of Initial Catalyst Activity) of Example 1, except that the catalyst taken here was used. The conversion of hydrogen chloride is shown in Table 1 as the catalyst activity of the supported ruthenium oxide catalyst (C1') after the accelerated thermal deterioration test.

TABLE 1

| | | Example 1 | Comparative Example 1 |
|---|---|---|---|
| Physical Properties of Catalyst | Pore Volume [$cm^3/g$] | 0.22 | 0.22 |
| | Average Pore Diameter [nm] | 79.2 | 73.6 |
| | Half Width (H) [nm] | 69.0 | 39.5 |
| | H/D | 0.87 | 0.54 |
| | BET Specific Surface Area [$m^2/g$] | 14 | 15 |
| | Catalyst Strength [N/sample] | 48.9 | 55.9 |
| Initial Catalyst Activity (Conversion of Hydrogen Chloride [%]) | | 9.5 | 9.8 |
| Catalyst Activity after Accelerated Thermal Deterioration Test (Conversion of Hydrogen Chloride [%]) | | 6.2 | 5.5 |

INDUSTRIAL APPLICABILITY

Chlorine can be produced selectively and efficiently.

The invention claimed is:

1. A method for producing chlorine by oxidizing hydrogen chloride with oxygen in the presence of a catalyst, the method being performed by a fixed-bed reaction method in which a hydrogen chloride-containing gas and an oxygen-containing gas are passed through a catalyst packed-bed, wherein the catalyst satisfies the following conditions (i), (ii) and (iii):
   (i) the BET specific surface area is from 1 to 250 $m^2/g$;
   (ii) a pore distribution curve having a pore diameter of 10 nm to 1000 nm as determined by a mercury intrusion method includes a peak having a value of H/D from 0.7 to 1.0; wherein H is the width at half-height of the peak and D is the average pore diameter; and
   (iii) the pore volume obtained by the mercury intrusion method is 0.1 to 0.4 $cm^3/g$.

2. The method for producing chlorine according to claim 1, wherein the catalyst is a supported ruthenium oxide catalyst.

3. The method for producing chlorine according to claim 1, wherein the catalyst is molded into a spherical granular shape or a cylindrical shape.

4. A catalyst for use in a reaction for oxidizing hydrogen chloride with oxygen, which comprises ruthenium oxide, and satisfies the following conditions (i), (ii) and (iii):
   (i) the BET specific surface area is from 1 to 250 $m^2/g$;
   a pore distribution curve having a pore diameter of 10 nm to 1000 nm as determined by a mercury intrusion method includes a peak having a value of H/D from 0.7 to 1.0; wherein H is the width at half-height of the peak; and D is the average pore diameter; and
   (iii) the pore volume obtained by the mercury intrusion method is 0.1 to 0.4 $cm^3/g$, wherein the reaction is a fixed-bed reaction in which a hydrogen chloride-containing gas and an oxygen-containing gas are passed through a catalyst packed-bed.

5. The catalyst according to claim 4, which is molded into a spherical granular shape or a cylindrical shape.

* * * * *